US011269450B2

United States Patent
Sasai et al.

(10) Patent No.: US 11,269,450 B2
(45) Date of Patent: Mar. 8, 2022

(54) ELECTROSTATIC CAPACITANCE SENSOR

(71) Applicant: Alps Alpine Co., Ltd., Tokyo (JP)

(72) Inventors: Kiyoshi Sasai, Miyagi-ken (JP); Kazufumi Naganuma, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/331,218

(22) Filed: May 26, 2021

(65) Prior Publication Data

US 2021/0294476 A1 Sep. 23, 2021

Related U.S. Application Data

(63) Continuation of application No. PCT/JP2019/042276, filed on Oct. 29, 2019.

(30) Foreign Application Priority Data

Nov. 28, 2018 (JP) .............................. JP2018-222468

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0446; G06F 3/0418
See application file for complete search history.

(56) References Cited

U.S. PATENT DOCUMENTS

| 8,952,913 B2 | 2/2015 | Lee et al. |
| 2015/0268783 A1 | 9/2015 | Yoon et al. |
| 2019/0384457 A1 | 12/2019 | Fujiyoshi |

FOREIGN PATENT DOCUMENTS

| JP | 2010-103885 | 5/2010 |
| JP | 2011-089937 | 5/2011 |
| JP | 2014-086072 | 5/2014 |
| JP | 2015-132506 | 7/2015 |
| JP | 2015-185169 | 10/2015 |
| WO | 2018/159460 | 9/2018 |
| WO | 2018/211760 | 11/2018 |

OTHER PUBLICATIONS

International Search Report from International Application No. PCT/JP2019/042276 dated Jan. 7, 2020.

*Primary Examiner* — Michael Pervan
(74) *Attorney, Agent, or Firm* — Beyer Law Group LLP

(57) ABSTRACT

An electrostatic capacitance sensor includes: at least one detection electrode; drive electrodes, capacitors being respectively formed between the drive electrodes and the at least one detection electrode; a driver capable of causing voltages of the drive electrodes to change independently from each other; a reference voltage generator that generates a reference voltage; a detection signal generator that transfers charge so that a voltage of the at least one detection electrode approaches the reference voltage and that generates a detection signal according to the transfer of the charge; and a controller that controls the driver. The driver is capable of applying the reference voltage to each of the drive electrodes. When the driver causes a voltage of one or more of the drive electrodes to change, the controller controls the driver so as to apply the reference voltage to the remaining drive electrodes.

8 Claims, 6 Drawing Sheets

ELECTROSTATIC CAPACITANCE SENSOR

CLAIM OF PRIORITY

This application is a Continuation of International Application No. PCT/JP2019/042276 filed on Oct. 29, 2019, which claims benefit of Japanese Patent Application No. 2018-222468 filed on Nov. 28, 2018. The entire contents of each application noted above are hereby incorporated by reference.

BACKGROUND OF THE INVENTION

1. Field of the Invention

The present disclosure relates to electrostatic capacitance sensors that detect changes in electrostatic capacitances and more particularly relates to a mutual-capacitance-type electrostatic capacitance sensor.

2. Description of the Related Art

Sensors based on a general mutual capacitance system detect electrostatic capacitances (mutual capacitances) of parasitic capacitors formed between different electrodes. For example, Japanese Unexamined Patent Application Publication No. 2015-132506 discloses an input device in which X electrodes and Y electrodes are arranged to cross each other in a lattice (FIG. 1), and mutual capacitances of capacitors formed between the X and Y electrodes are detected at the respective portions at which they cross each other.

FIG. 6A is a diagram illustrating a general configuration of an electrostatic capacitance sensor based on a mutual capacitance system. The electrostatic capacitance sensor illustrated in FIG. 6A includes a detection electrode ES, drive electrodes ED that each cross the detection electrode ES, a charge amplifier 91 connected to the detection electrode ES, a switch circuit 92, a drive-signal supply circuit 93, and a reference-voltage generation circuit 94. Parasitic capacitors CM are respectively formed at portions where the detection electrode ES and the drive electrodes ED cross each other. The switch circuit 92 sequentially selects one drive electrode ED from the drive electrodes ED and connects the selected drive electrode ED to the drive-signal supply circuit 93. The drive-signal supply circuit 93 supplies a drive signal to the drive electrode ED selected by the switch circuit 92. The charge amplifier 91 detects charge input from the capacitor CM in response to the supply of the drive signal.

As illustrated in FIG. 6A, the charge amplifier 91 includes an operational amplifier OP1, a feedback capacitor Cf, and a switch SW1. The operational amplifier OP1 has an inverting input terminal connected to the detection electrode ES and is also connected to an output terminal of the operational amplifier OP1 via the feedback capacitor Cf. The operational amplifier OP1 has a non-inverting input terminal to which a reference voltage Vr from the reference-voltage generation circuit 94 is input.

When the switch SW1 is turned on to discharge charge in the feedback capacitor Cf, the operational amplifier OP1 outputs a voltage Vout that is generally equal to the reference voltage Vr. In this state, when the switch SW1 is turned off, and a drive signal is supplied to one of the drive electrodes ED, the operational amplifier OP1 controls the voltage Vout so that the detection electrode ES is maintained generally at the reference voltage Vr. Since the detection electrode ES is maintained at the reference voltage Vr, a voltage at the capacitor CM changes due to the drive signal. When the voltage at the capacitor CM changes, charge that is proportional to the electrostatic capacitance (the mutual capacitance) of the capacitor CM is transferred between the capacitor CM and the feedback capacitor Cf. As a result of the transfer of the charge, signal components that are generally proportional to the mutual capacitance of the capacitor CM appear in the voltage Vout (a voltage of the feedback capacitor Cf). When the mutual capacitance of the capacitor CM changes due to approach of a finger or the like, the signal components that appear in the voltage Vout also change. Accordingly, detecting a change in the signal components that appear in the voltage Vout makes it possible to determine whether or not a finger or the like is in close proximity.

As illustrated in FIG. 6A, the switch circuit 92 connects one of the drive electrodes ED to the drive-signal supply circuit 93 and connects each of the other drive electrodes ED that are not connected to the drive-signal supply circuit 93 to ground. As described above, since the detection electrode ES is maintained generally at the reference voltage Vr, the voltages at the capacitors CM formed between the drive electrodes ED connected to ground and the detection electrode ES (these capacitors CM are hereinafter referred to as "non-detection-target capacitors CM") are maintained generally at the reference voltage Vr. When the reference voltage Vr is assumed to be an ideal direct-current (DC) voltage, the non-detection-target capacitors CM are maintained at a constant voltage. Thus, no charge is transferred between each non-detection-target capacitor CM and the feedback capacitor Cf, so that the non-detection-target capacitors CM do not affect the signal components of the voltage Vout.

However, when a noise component is superimposed on the reference voltage Vr, the noise component affects the non-detection-target capacitors CM, and thus charge is transferred between each non-detection-target capacitor CM and the feedback capacitor Cf. Consequently, error components induced by the noise component of the reference voltage Vr appear in the voltage Vout.

FIG. 6B is a diagram illustrating an alternating-current equivalent circuit of the electrostatic capacitance sensor, illustrated in FIG. 6A, when noise Vnz is superimposed on the reference voltage Vr. In FIG. 6B, Ctr represents an electrostatic capacitance of the detection-target capacitor CM (that is, the capacitor CM formed between the drive electrode ED connected to the drive-signal supply circuit 93 and the detection electrode ES). Also, Ctg represents an electrostatic capacitance of a parasitic capacitor formed between the detection electrode ES and ground. The parasitic capacitor Ctg includes the above-described non-detection-target capacitors CM. Based on the equivalent circuit illustrated in FIG. 6B, an error component ΔVout of the voltage Vout, the error component ΔVout being induced by noise Vnz, is given by:

$$\Delta Vout = Vnz \times \{1 + (Ctr + Ctg)/Cf\} \qquad (1).$$

The error component ΔVout increases, as the capacitor Ctg increases, as represented in equation (1). The capacitor Ctg increases, as the number of non-detection-target capacitors CM increases. Thus, when the number of drive electrodes ED is large, there is a problem that the error component ΔVout induced by the noise Vnz in the reference voltage Vr increases.

SUMMARY OF THE INVENTION

Accordingly, the present disclosure provides an electrostatic capacitance sensor that can reduce the amount of noise-induced error in a detection result.

An electrostatic capacitance sensor according to a first aspect of the present disclosure includes: at least one detection electrode; drive electrodes, capacitors being respectively formed between the drive electrodes and the at least one detection electrode; a driver capable of causing voltages of the drive electrodes to change independently from each other; a reference voltage generator that generates a reference voltage; a detection signal generator that transfers charge so that a voltage of the at least one detection electrode approaches the reference voltage and that generates a detection signal according to the transfer of the charge; and a controller that controls the driver. The detection signal generator includes a first operational amplifier having an inverting input terminal and a non-inverting input terminal. The at least one detection electrode is connected to the inverting input terminal of the first operational amplifier, and the reference voltage is input to the non-inverting input terminal of the first operational amplifier. The reference voltage generator includes a reference voltage source having an output terminal, a first resistor and a second resistor that are connected in series between the output terminal of the reference voltage source and ground, and a second operational amplifier having an inverting input terminal, a non-inverting input terminal, and an output terminal, the non-inverting input terminal being connected to a connection midpoint of the first resistor and the second resistor. The inverting input terminal of the second operational amplifier is connected to the output terminal of the second operational amplifier. The driver is capable of applying the reference voltage to each of the drive electrodes, and when the driver causes a voltage of one or more of the drive electrodes to change, the controller controls the driver so as to apply the reference voltage to the remaining drive electrodes.

In the electrostatic capacitance sensor according to the first aspect, when the driver changes the voltage of one or more of the drive electrodes, the reference voltage is applied to the remaining drive electrodes. At this point in time, the detection signal generator transfers charge through the at least one detection electrode, so that the voltage of the detection electrode is maintained at a voltage close to the reference voltage. Thus, even when a noise component is superimposed on the reference voltage, almost no voltage occurs at the capacitors (non-detection-target capacitors) formed between the remaining drive electrodes and the at least one detection electrode, and almost no charge is accumulated in the non-detection-target capacitors. That is, the non-detection-target capacitors generate almost no charge to be transferred through the at least one detection electrode. Accordingly, the amount of error in the detection signals which is induced by a noise component affecting the non-detection-target capacitors, the noise component being superimposed on the reference voltage, decreases.

The electrostatic capacitance sensor according to the first aspect may further include a switch portion capable of selecting one detection electrode from the detection electrodes, connecting the selected detection electrode to the detection signal generator, and connecting each of the detection electrodes to the reference voltage. When the switch portion connects one of the detection electrodes to the detection signal generator, the controller may control the switch portion so that the remaining detection electrodes are connected to the reference voltage.

According to this configuration, when the switch portion connects one of the detection electrodes to the detection signal generator, the remaining detection electrodes are connected to the reference voltage. Thus, even when a noise component is superimposed on the reference voltage, almost no voltage occurs at the parasitic capacitors formed between the one detection electrode and the remaining detection electrodes, and almost no charge is accumulated in these parasitic capacitors. That is, the parasitic capacitors between the detection electrodes generate almost no charge to be transferred through the one detection electrode. Accordingly, the amount of error in the detection signals which is induced by a noise component affecting the parasitic capacitors, the noise component being superimposed on the reference voltage, decreases.

The driver may be capable of supplying a drive signal to each of the drive electrodes, the drive signal being one of a drive signal for increasing a voltage of the drive electrode by an amount corresponding to a predetermined voltage difference, a drive signal for reducing the voltage of the drive electrode by the amount corresponding to the predetermined voltage difference, and a drive signal for applying the reference voltage to the drive electrode, and the number of drive electrodes being M, where M is an integer greater than or equal to 2. When a combination of M drive signals that are simultaneously supplied to the M drive electrodes is defined as a drive pattern, the controller may control the driver so as to supply the drive signals to the respective M drive electrodes M times in accordance with M different drive patterns, may obtain M detection signals that the detection signal generator generates with respect to the M different drive patterns by transferring the charge through one of the detection electrodes, and may calculate mutual capacitance values of M capacitors formed between the one detection electrode and the M drive electrodes, based on the M detection signals.

According to this configuration, when the drive signal for applying the reference voltage is supplied to one or more of the drive electrodes, almost no voltage occurs at the capacitors formed between the one or more drive electrodes and the detection electrodes, and almost no change is accumulated in these capacitors. In this case, regardless of whether or not a noise component is superimposed on the reference voltage, the capacitors formed between the one or more drive electrodes and the detection electrodes generate almost no charge to be transferred through the detection electrodes. Accordingly, the amount of error in the detection signals, the error being induced by a noise component affecting one or more capacitors formed between the one or more drive electrodes and the detection electrodes, decreases. Thus, the amount of error due to a noise component also decreases in the mutual capacitance values of M capacitors, the mutual capacitance values being calculated based on the M detection signals.

The first operational amplifier may further have an output terminal, and the detection signal generator may include a feedback capacitor provided on a path between the output terminal of the first operational amplifier and the inverting input terminal of the first operational amplifier.

An electrostatic capacitance sensor according to a second aspect of the present disclosure includes: at least one detection electrode; drive electrodes, capacitors being respectively formed between the drive electrodes and the at least one detection electrode; a driver capable of causing voltages of the drive electrodes to change independently from each other; a reference voltage generator that generates a reference voltage; a detection signal generator that transfers charge so that a voltage of the at least one detection electrode approaches the reference voltage and that generates a detection signal according to the transfer of the charge; a pseudo-reference voltage generator that generates a pseudo reference voltage feedback-controlled so as to approach the reference voltage; and a controller that controls the driver. The detection signal generator includes a first operational amplifier having an inverting input terminal and a non-inverting input terminal. The at least one detection electrode is connected to the inverting input terminal of the first operational amplifier, and the reference voltage is input to the non-inverting input terminal of the first operational amplifier. The reference voltage generator includes a reference voltage source having an output terminal, a first resistor and a second resistor that are connected in series between the output terminal of the reference voltage source and ground, and a second operational amplifier having an inverting input terminal, a non-inverting input terminal, and an output terminal, the non-inverting input terminal being connected to a connection midpoint of the first resistor and the second resistor. The driver is capable of applying the pseudo reference voltage to each of the drive electrodes, and when the driver causes a voltage of one or more of the drive electrodes to change, the controller controls the driver so as to apply the pseudo reference voltage to the remaining drive electrodes.

In the electrostatic capacitance sensor according to the second aspect, when the driver causes a voltage of one or more of the drive electrodes to change, the pseudo reference voltage is applied to the remaining drive electrodes. At this point in time, the detection signal generator transfers charge through the at least one detection electrode, so that the voltage of the at least one detection electrode is maintained at a voltage close to the reference voltage. Also, the pseudo reference voltage is maintained at a voltage close to the reference voltage by feedback control in the pseudo-reference voltage generator. Thus, even when a noise component is superimposed on the reference voltage, almost no voltage occurs at the capacitors (non-detection-target capacitors) formed between the remaining drive electrodes and the at least one detection electrode, and almost no charge is accumulated in the non-detection-target capacitors. That is, the non-detection-target capacitors generate almost no charge to be transferred through the at least one detection electrode. Accordingly, the amount of error in the detection signals which is induced by a noise component affecting the non-detection-target capacitors, the noise component being superimposed on the reference voltage, decreases.

The electrostatic capacitance sensor according to the second aspect may further include a switch portion capable of selecting one detection electrode from the detection electrodes, connecting the selected detection electrode to the detection signal generator, and connecting each of the detection electrodes to the pseudo reference voltage. When the switch portion connects one of the detection electrodes to the detection signal generator, the controller may control the switch portion so that the remaining detection electrodes are connected to the pseudo reference voltage.

According to this configuration, when the switch portion connects one of the detection electrodes to the detection signal generator, the remaining detection electrodes are connected to the pseudo reference voltage. Thus, even when a noise component is superimposed on the reference voltage, almost no voltage occurs at the parasitic capacitors formed between the one detection electrode and the remaining detection electrodes, and almost no charge is accumulated in these parasitic capacitors. That is, the parasitic capacitors between the detection electrodes generate almost no charge to be transferred through the one detection electrode. Accordingly, the amount of error in the detection signals which is induced by a noise component affecting the parasitic capacitors, the noise component being superimposed on the reference voltage, decreases.

The driver may be capable of supplying a drive signal to each of the drive electrodes, the drive signal being one of a drive signal for increasing a voltage of the drive electrode by an amount corresponding to a predetermined voltage difference, a drive signal for reducing the voltage of the drive electrode by the amount corresponding to the predetermined voltage difference, and a drive signal for applying the pseudo reference voltage to the drive electrode, and the number of drive electrodes being M, where M is an integer greater than or equal to 2. When a combination of M drive signals that are simultaneously supplied to the M drive electrodes is defined as a drive pattern, the controller may control the driver so as to supply the drive signals to the respective M drive electrodes M times in accordance with M different drive patterns, may obtain M detection signals that the detection signal generator generates with respect to the M different drive patterns by transferring the charge through one of the detection electrodes, and may calculate mutual capacitance values of M capacitors formed between the one detection electrode and the M drive electrodes, based on the M detection signals.

According to this configuration, when the drive signal for applying the pseudo reference voltage is supplied to one or more of the drive electrodes, almost no voltage occurs at the capacitors formed between the one or more drive electrodes and the detection electrodes, and almost no change is accumulated in these capacitors. In this case, regardless of whether or not a noise component is superimposed on the reference voltage, the capacitors formed between the one or more drive electrodes and the detection electrodes generate almost no charge to be transferred through the detection electrodes. Accordingly, the amount of error in the detection signals, the error being induced by a noise component affecting one or more capacitors formed between the one or more drive electrodes and the detection electrodes, decreases. Thus, the amount of error due to a noise component also decreases in the mutual capacitance values of M capacitors, the mutual capacitance values being calculated based on the M detection signals.

The first operational amplifier may further have an output terminal, and the detection signal generator may include a feedback capacitor provided on a path between the output terminal of the first operational amplifier and the inverting input terminal of the first operational amplifier.

According to the present disclosure, it is possible to provide an electrostatic capacitance sensor that can reduce the amount of noise-induced error in a detection result.

DESCRIPTION OF THE PREFERRED EMBODIMENTS

First Embodiment

Figure 1:
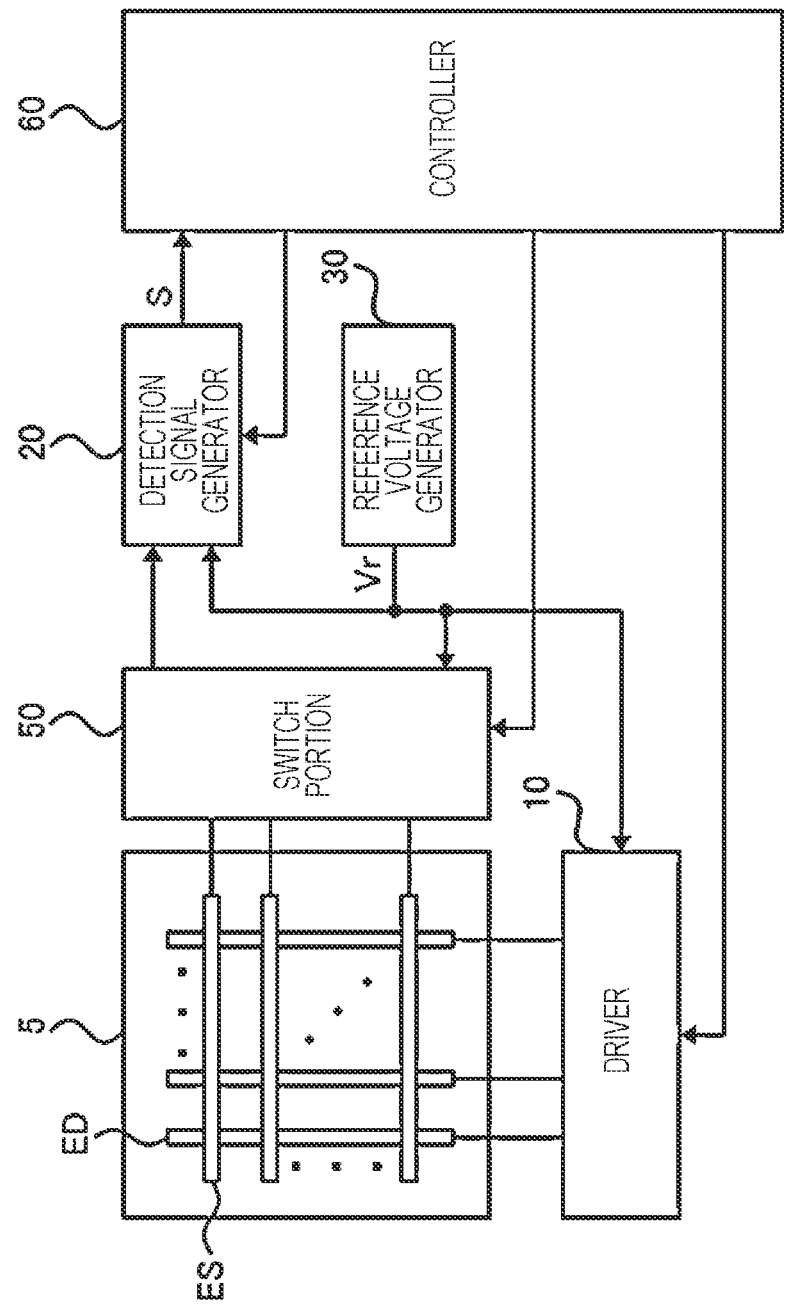
FIG. 1 is a diagram illustrating one example of the configuration of an electrostatic capacitance sensor according to a first embodiment.
Figure 2:
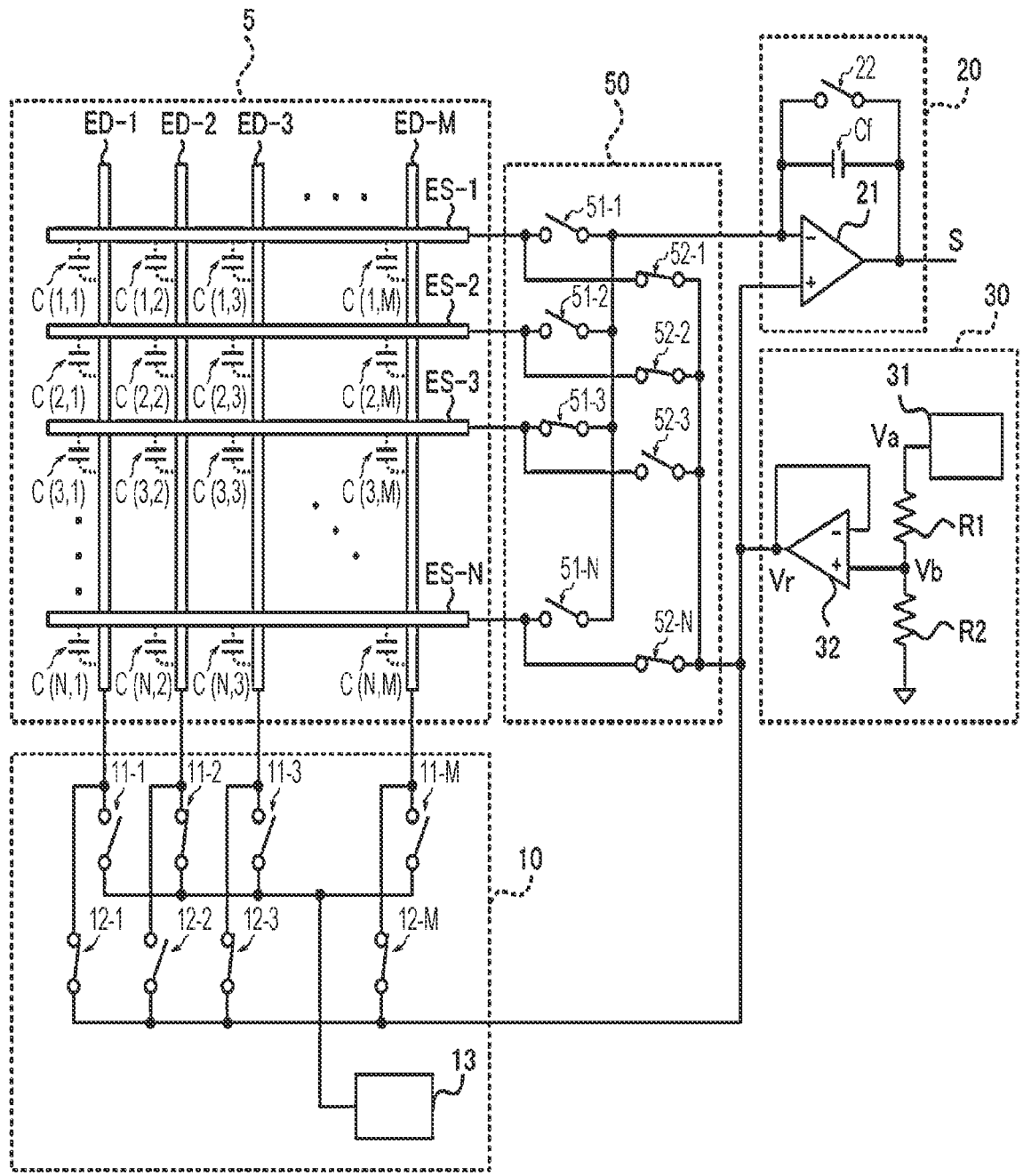
FIG. 2 is a diagram illustrating an example configuration of individual portions in the electrostatic capacitance sensor according to the first embodiment.

FIG. 1 is a diagram illustrating one example of the configuration of an electrostatic capacitance sensor according to a first embodiment. FIG. 2 is a diagram illustrating an example configuration of individual portions in the electrostatic capacitance sensor. The electrostatic capacitance sensor according to the present embodiment is a sensor that detects a change in an electrostatic capacitance (a mutual capacitance) between electrodes, the change being caused by close proximity of an object, such as a finger. The electrostatic capacitance sensor can be applied to, for example, various input devices (such as a touchpad, a touch panel, and a touch sensor) that detect touch operations of users and so on. Herein, the "close proximity" means being close or near and does not limit whether or not an object is in contact.

The electrostatic capacitance sensor illustrated in FIGS. 1 and 2 includes an electrode portion 5, a driver 10, a detection signal generator 20, a reference voltage generator 30, a switch portion 50, and a controller 60.

The electrode portion 5 includes N detection electrodes ES-1 to ES-N (which may hereinafter be referred to as "detection electrodes ES" without distinction therebetween) and M drive electrodes ED-1 to ED-M (which may hereinafter be referred to as "drive electrodes ED" without distinction therebetween). Parasitic capacitors are respectively formed between the N detection electrodes ES and the M drive electrodes ED. Specifically, capacitors C(i, j) are formed between the detection electrodes ES-i and the drive electrodes ED-j. Herein, i is an integer from 1 to N, and j is an integer from 1 to M.

The detection electrodes ES and the drive electrodes ED are, for example, conductor patterns formed on a printed circuit board, and the detection electrodes ES and the drive electrodes ED are formed in respective different wiring layers. In the example in FIG. 2, the N detection electrodes ES extend parallel to each other, and the M drive electrodes ED also extend parallel to each other. The directions in which the detection electrodes ES extend and the directions in which the drive electrodes ED extend orthogonally cross each other, and in plan view, the N detection electrodes ES and the M drive electrodes ED cross each other in a lattice. Each of the detection electrodes ES and the drive electrodes ED has an elongated rectangular shape. The numbers of detection electrodes ES and drive electrodes ED illustrated in FIG. 2 and the arrangements, the shapes, and so on thereof are examples and can be arbitrarily changed. For example, each of the shapes of the detection electrodes ES and the drive electrodes ED may be a shape formed by coupling a plurality of rhombus portions in one direction.

In accordance with control of the controller 60, the driver 10 causes voltages of the M drive electrodes ED to change independently from each other. In accordance with control of the controller 60, the driver 10 applies a reference voltage Vr to each of the M drive electrodes ED.

In the example in FIG. 2, the driver 10 includes M switches 11-1 to 11-M, M switches 12-1 to 12-M, and a drive signal generator 13. The switch 11-j is provided on a path between an output of the drive signal generator 13 and the drive electrode ED-j and is turned on or off in accordance with control of the controller 60. When the switch 11-j is turned on, a drive signal is supplied from the drive signal generator 13 to the drive electrode ED-j. The switch 12-j is provided on a path between an output of the reference voltage generator 30, which is described below, and the drive electrode ED-j and is turned on or off in accordance with control of the controller 60. When the switch 12-j is turned on, the reference voltage Vr of the reference voltage generator 30 is applied to the drive electrode ED-j.

In accordance with control of the controller 60, the drive signal generator 13 generates a drive signal for changing the voltage of each drive electrode ED. For example, the drive signal generated by the drive signal generator 13 may be a signal whose voltage changes in a pulsed manner or may be a sinusoidal-wave signal that oscillates at a predetermined frequency.

In accordance with control of the controller 60, the switch portion 50 selects one detection electrode ES from the N detection electrodes ES and connects the selected detection electrode ES to the detection signal generator 20, which is described below. Also, in accordance with control of the controller 60, the switch portion 50 connects each of the N detection electrodes ES to the reference voltage Vr.

In the example in FIG. 2, the switch portion 50 includes N switches 51-1 to 51-N and N switches 52-1 to 52-N. The switch 51-i is provided on a path between an input of the detection signal generator 20 and the detection electrode ES-i and is turned on or off in accordance with control of the controller 60. When the switch 51-i is turned on, charge is transferred between the detection electrode ES-i and the detection signal generator 20 so that a voltage of the detection electrode ES-i approaches the reference voltage Vr. The switch 52-i is provided on a path between the output of the reference voltage generator 30 and the detection electrode ES-i and is turned on or off in accordance with control of the controller 60. When the switch 52-i is turned on, the reference voltage Vr of the reference voltage generator 30 is applied to the detection electrode ES-i.

The detection signal generator 20 transfers charge through the detection electrode ES so that the voltage of the detection electrode ES connected via the switch portion 50 approaches the reference voltage Vr, and generates a detection signal S according to the transfer of the charge.

For example, when the voltage of the drive electrode ED-j increases in a state in which the switch 51-j is on, the voltage of the detection electrode ES-i also attempts to increase, since the detection electrode ES-i is electrostatically coupled to the drive electrode ED-j via the capacitor C(i, j). At this point in time, the detection signal generator 20 transfers negative charge to the detection electrode ES-i (removes positive charge from the detection electrode ES-i) so that the voltage of the detection electrode ES-i does not increase beyond the reference voltage Vr. Conversely, when the voltage of the drive electrode ED-j decreases in a state in which the switch 51-j is on, and the voltage of the detection electrode ES-i also attempts to decrease, the detection signal generator 20 transfers positive charge to the detection electrode ES-i (removes negative charge from the detection electrode ES-i) so that the voltage of the detection electrode ES-i does not decrease below the reference voltage Vr.

When the voltage of the detection electrode ES-i is maintained at the reference voltage Vr, the charge transferred through the detection electrode ES-i is generally proportional to an electrostatic capacitance (a mutual capacitance) of the capacitor $C(i, j)$. For example, the detection signal S generated by the detection signal generator 20 causes a change that is proportional to the positive or negative charge transferred through the detection electrode ES-i. In this case, a change in the detection signal S is generally proportional to a change in the mutual capacitance of the capacitor $C(i, j)$.

In the example in FIG. 2, the detection signal generator 20 includes a first operational amplifier 21, a feedback capacitor Cf, and a switch 22. The first operational amplifier 21 has an inverting input terminal, a non-inverting input terminal, and an output terminal. The inverting input terminal is connected to the detection electrodes ES-1 to ES-N via the switches 51-1 to 51-N in the switch portion 50. The reference voltage Vr of the reference voltage generator 30 is input to the non-inverting input terminal of the first operational amplifier 21. The feedback capacitor Cf is provided on a path between the output terminal and the inverting input terminal of the first operational amplifier 21. The switch 22 is connected in parallel with the feedback capacitor Cf.

When the voltage of the detection electrode ES connected to the inverting input terminal of the first operational amplifier 21 increases beyond the reference voltage Vr, an output voltage (the detection signal S) of the first operational amplifier 21 decreases, so that negative charge is transferred from the feedback capacitor Cf to the capacitor $C(i, j)$, thus suppressing an increase in the voltage of the detection electrode ES. Also, when the voltage of the detection electrode ES connected to the inverting input terminal of the first operational amplifier 21 decreases below the reference voltage Vr, the output voltage (the detection signal S) of the first operational amplifier 21 increases, so that positive charge is transferred from the feedback capacitor Cf to the capacitor $C(i, j)$, thus suppressing a reduction in the voltage of the detection electrode ES.

The reference voltage generator 30 generates the reference voltage Vr, which is a generally constant DC voltage. In the example in FIG. 2, the reference voltage generator 30 includes a reference voltage source 31, a second operational amplifier 32, a first resistor R1, and a second resistor R2. The reference voltage source 31 generates a DC voltage Va that is independent from a power-supply voltage, for example, by using a bandgap reference circuit. The DC voltage Va may be an internal power-supply voltage in an application-specific integrated circuit (ASIC). The first resistor R1 and the second resistor R2 are connected in series between an output terminal of the reference voltage source 31 and ground. A voltage Vb resulting from voltage division of the DC voltage Va occurs at a connection midpoint of the first resistor R1 and the second resistor R2. The second operational amplifier 32 has an inverting input terminal, a non-inverting input terminal, and an output terminal. The inverting input terminal of the second operational amplifier 32 is connected to the output terminal thereof. The voltage Vb that occurs at the connection midpoint of the first resistor R1 and the second resistor R2 is input to the non-inverting input terminal of the second operational amplifier 32. The second operational amplifier 32 outputs the reference voltage Vr, which is generally equal to the voltage Vb.

The controller 60 controls the individual portions in the electrostatic capacitance sensor so as to generate a detection signal S corresponding to the mutual capacitance of the capacitor $C(i, j)$ formed between the drive electrode ED-j and the detection electrode ES-i in the electrode portion 5. The controller 60 may include, for example, a computer that executes processes in accordance with instruction codes in a program. Also, the controller 60 may execute all processes based on a program by using a computer or may execute at least one or more processes by using dedicated hardware (such as an ASIC or a field programmable gate array (FPGA)).

When the driver 10 changes the voltage(s) of one or more of the drive electrodes ED, the controller 60 controls the driver 10 so as to apply the reference voltage Vr to the remaining drive electrodes ED. Also, when the switch portion 50 connects one of the detection electrodes ES to the detection signal generator 20, the controller 60 controls the switch portion 50 so as to connect the remaining detection electrodes ES to the reference voltage Vr.

Next, a description will be given of an operation for generating a detection signal S corresponding to the mutual capacitance of the capacitor $C(i, j)$ formed between the drive electrode ED-j and the detection electrode ES-i in the electrostatic capacitance sensor according to the present embodiment which has the above-described configuration.

First, the controller 60 turns on the switch 22 in the detection signal generator 20 to discharge charge accumulated in the feedback capacitor Cf.

Also, the controller 60 controls the switches 51-1 to 51-N and 52-1 to 52-N in the switch portion 50 so that one detection electrode ES-i is connected to the detection signal generator 20, and the other detection electrodes ES are connected to the reference voltage Vr. In addition, the controller 60 controls the switches 11-1 to 11-M and 12-1 to 12-M in the driver 10 so that one drive electrode ED-j is connected to the drive signal generator 13, and the other drive electrodes ED are connected to the reference voltage Vr.

Next, the controller 60 turns off the switch 22 in the detection signal generator 20 and causes the drive signal to be supplied from the drive signal generator 13 to the drive electrode ED-j in a state in which the charge accumulated in the feedback capacitor Cf is substantially zero. For example, the drive signal generator 13 generates a drive signal for increasing the voltage of the drive electrode ED-j from a ground level to a power source voltage level.

When the voltage of the drive electrode ED-j changes due to the drive signal, and a voltage difference occurs between the voltage of the detection electrode ES-i and the reference voltage Vr in response thereto, the detection signal generator 20 transfers charge through the detection electrode ES-i so that the voltage difference decreases. For example, when the voltage of the drive electrode ED-j increases, and the voltage of the detection electrode ES-i increases beyond the reference voltage Vr in response thereto, the detection signal generator 20 transfers negative charge to the capacitor $C(i, j)$ via the detection electrode ES-i to suppress an increase in the voltage of the detection electrode ES-i. As a result, the detection electrode ES-i is maintained at a voltage close to the reference voltage Vr. The amount of charge transferred to the capacitor $C(i, j)$ is proportional to the mutual capacitance of the capacitor $C(i, j)$. That is, as the mutual capacitance of the capacitor $C(i, j)$ increases, the amount of charge transferred to the capacitor $C(i, j)$ also increases in order to maintain the detection electrode ES-i at the reference voltage Vr.

When the charge is transferred to the capacitor $C(i, j)$, an amount of charge that is the same as the amount of the transferred charge is also accumulated in the feedback capacitor Cf. Since the amount of the charge accumulated in the feedback capacitor Cf is substantially zero immediately before the drive signal is supplied to the drive electrode ED-j, the amount of the charge accumulated in the feedback capacitor Cf after the drive signal is supplied is generally equal to the amount of the charge transferred to the capacitor C(i, j) via the detection electrode ES-i. That is, an amount of charge that is proportional to the mutual capacitance of the capacitor C(i, j) is accumulated in the feedback capacitor Cf, and a voltage that is proportional to the amount of the charge occurs at the feedback capacitor Cf. Accordingly, a voltage that occurs at the feedback capacitor Cf after the drive signal is supplied is proportional to the mutual capacitance of the capacitor C(i, j).

Since the detection signal S indicates a sum of the voltage of the feedback capacitor Cf and the reference voltage Vr, a change in the detection signal S corresponds to a change in the voltage of the feedback capacitor Cf and is proportional to a change in the mutual capacitance of the capacitor C(i, j). The controller 60 detects a change in the mutual capacitance of each capacitor C(i, j), based on a change in the detection signal S obtained for the capacitor C(i, j). Bason on a result of the detection, the controller 60 determines whether or not an object (such as a finger) is in close proximity to each capacitor C(i, j) and determines the degree of close proximity.

As described above, in the electrostatic capacitance sensor according to the present embodiment, when the driver 10 changes the voltage(s) of one or more of the drive electrodes ED, the reference voltage Vr is applied to the remaining drive electrodes ED. At this point in time, the detection signal generator 20 transfers charge through each detection electrode ES, so that the voltage of the detection electrode ES is maintained at a voltage close to the reference voltage Vr. Thus, even when a noise component is superimposed on the reference voltage Vr generated by the reference voltage generator 30, almost no voltage occurs at the capacitors C(i, j) formed between the remaining drive electrodes ED and the detection electrodes ES (these capacitors C(i, j) may hereinafter be referred to as "non-detection-target capacitors C(i, j)"), and almost no charge is accumulated in the non-detection-target capacitors C(i, j). That is, the non-detection-target capacitors C(i, j) generate almost no charge to be transferred through the detection electrodes ES. Accordingly, even when a noise component is superimposed on the reference voltage Vr, the noise component does not affect the non-detection-target capacitors C(i, j), and charges generated in the non-detection-target capacitors C(i, j) are not transferred through the detection electrodes ES. Thus, it is possible to reduce the amount of error in the detection signals S to a minute amount.

Also, in the electrostatic capacitance sensor according to the present embodiment, when the switch portion 50 connects one of the detection electrodes ES to the detection signal generator 20, the remaining detection electrodes ES are connected to the reference voltage Vr. Thus, even when a noise component is superimposed on the reference voltage Vr, almost no voltage occurs at parasitic capacitors formed between the detection electrode ES connected to the detection signal generator 20 and the remaining detection electrodes ES, and almost no charge is accumulated in these parasitic capacitors. That is, the parasitic capacitors formed between the detection electrode ES connected to the detection signal generator 20 and the remaining detection electrodes ES generate almost no charge to be transferred through the detection electrode ES connected to the detection signal generator 20. Accordingly, even when a noise component is superimposed on the reference voltage Vr, the noise component does not affect the parasitic capacitors between the detection electrodes ES, and charges generated in the capacitors are not transferred through the detection electrodes ES. Thus, it is possible to reduce the amount of error in the detection signals S to a minute amount.

Second Embodiment

Figure 3:
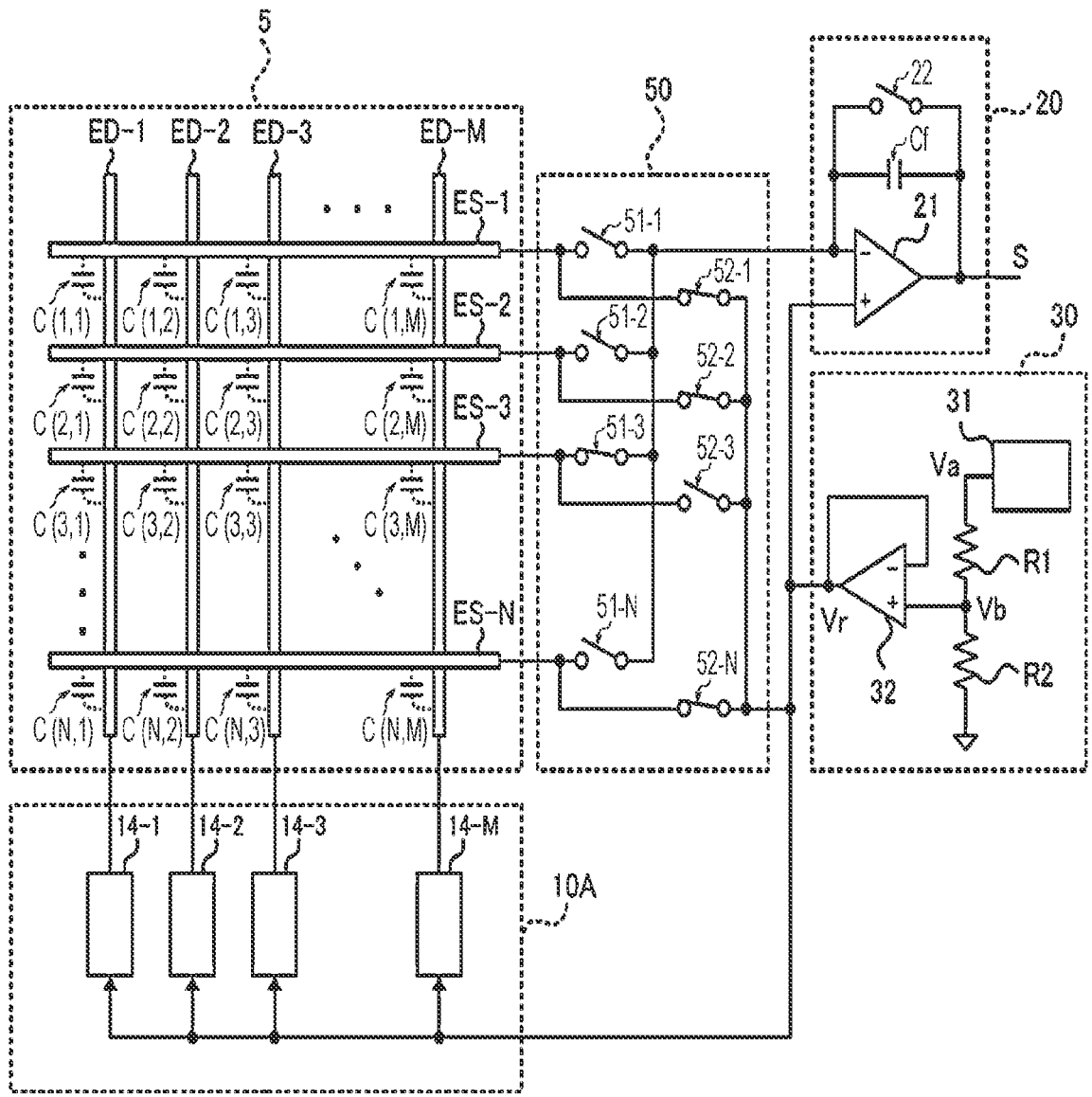
FIG. 3 is a diagram illustrating an example configuration of individual portions in an electrostatic capacitance sensor according to a second embodiment.

Next, a description will be given of an electrostatic capacitance sensor according to a second embodiment. FIG. 3 is a diagram illustrating an example configuration of individual portions in the electrostatic capacitance sensor according to the second embodiment. The electrostatic capacitance sensor according to the second embodiment is substantially the same as the electrostatic capacitance sensor illustrated in FIG. 2, except that the driver 10 in the electrostatic capacitance sensor illustrated in FIG. 2 is replaced with a driver 10A, and the processing in the controller 60 is modified.

In accordance with control of the controller 60, the driver 10A supplies independent drive signals to the respective M drive electrodes ED. In the example in FIG. 3, the driver 10A includes M drive signal generators 14-1 to 14-M that respectively generate drive signals (the M drive signal generators 14-1 to 14-M may hereinafter be referred to as "drive signal generators 14" without distinction therebetween). The drive signal generator 14-j generates a drive signal to be supplied to the drive electrode ED-j.

The drive signal generator 14-j can generate three types of drive signal (which may hereinafter be referred to as a "first drive signal", a "second drive signal", and a "third drive signal"). The first drive signal is a signal for causing the voltage of the drive electrode ED-j to increase by an amount corresponding to a predetermined voltage difference VD, and the second drive signal is a signal for causing the voltage of the drive electrode ED-j to decrease by the amount corresponding to the voltage difference VD. The third drive signal is a signal for applying the reference voltage Vr to the drive electrode ED-j.

A combination of M drive signals (each of which is one of the first drive signal, the second drive signal, and the third drive signal) that the M drive signal generators 14 simultaneously supply to the M drive electrodes ED is herein defined as a "drive pattern".

The controller 60 controls the drive signal generators 14 in the driver 10A so as to supply the drive signal (the first drive signal, the second drive signal, or the third drive signal) to each of the M drive electrodes ED in accordance with M different drive patterns M. That is, the controller 60 repeats an operation for simultaneously supplying the drive signals to the M drive electrodes ED M times, while switching the drive patterns. Also, while driving the detection electrodes ES in accordance with the M different drive patterns, the controller 60 controls the switch portion 50 so that the detection signal generator 20 transfers charge through one drive electrode ED (so that the detection signal generator 20 is connected to one detection electrode ES). The controller 60 then obtains M detection signals S that the detection signal generator 20 generates with respect to the M different drive patterns, and based on the M detection signals S, the controller 60 calculates mutual capacitance values of the respective M capacitors C(i, j) formed between the detection electrode ES connected to the detection signal generator 20 and the M drive electrodes ED.

The mutual capacitances of the M capacitors C(i, 1), C(i, 2), . . . , and C(i, M) formed between the M drive electrodes ED-1 to ED-M and one detection electrode ES-i are respectively represented by C(1), C(2), . . . , and C(M). Also, charges transferred from the detection electrode ES-i to the M capacitors C(i, 1), C(i, 2), . . . , and C(i, M) when the drive signals are respectively supplied to the M drive electrodes ED-1 to ED-M are respectively represented by Q(1), Q(2), . . . , and Q(M). In addition, changes in the mutual capacitances C(1), C(2), . . . , and C(M) compared with a case in which an object (such as a finger) is not in close proximity to the electrode portion 5 are respectively represented by $\Delta C(1)$, $\Delta C(2)$, . . . , and $\Delta C(M)$. In this case, a change $\Delta Q(j)$ in the charge Q(j), the change being caused by the mutual capacitance change $\Delta C(j)$, is given by:

$$\Delta Q(j) = A(j) \times VD \times \Delta C(j) \quad (2).$$

A(j) in equation (2) represents a coefficient, and in accordance with the types of drive signal supplied to the drive electrode ED-j, the coefficient A(j) takes following values:

For the first drive signal: $A(j)=1$ \quad (3)

For the second drive signal: $A(j)=-1$ \quad (4)

For the third drive signal: $A(j)=0$ \quad (5)

Charge Qcf accumulated in the feedback capacitor Cf when the drive signals are simultaneously supplied to the M drive electrodes ED-1 to ED-M is given by:

$$Qcf = Q(1) + Q(2) + \ldots + Q(M) \quad (6).$$

A change $\Delta Qcf$ relative to the charge Qcf when an object (such as a finger) is not in close proximity to the electrode portion 5 is given by:

$$\Delta Qcf = \Delta Q(1) + \Delta Q(2) + \ldots + \Delta Q(M) \quad (7).$$

The change $\Delta Qcf$ in the charge in the feedback capacitor Cf is given by:

$$\Delta Qcf = Cf \times \Delta S \quad (8).$$

where $\Delta S$ represents a change in the detection signal S which corresponds to the change $\Delta Qcf$, and Cf represents the electrostatic capacitance of the feedback capacitor Cf.

Equations (2) and (8) are substituted into equation (7) to obtain an equation below:

$$B \times \Delta S = A(1) \times \Delta C(1) + \ldots + A(M) \times \Delta C(M) \quad (9)$$

where $B = Cf/VD$ \quad (10).

In equation (9), coefficient B and coefficients A(1), A(2), . . . , and A(M) respectively have known values. Also, a combination of the M coefficients A(1), A(2), . . . , and A(M) differs for each of the M drive patterns. When the M detection signals S corresponding to the M different drive patterns are obtained, the controller 60 calculates the change $\Delta S$ relative to a reference value (such as an average value of the detection signals S when an object is not in close proximity to the electrode portion 5), for each of the M detection signals S. When M changes $\Delta S$ are obtained, M equations (9) in which combinations of the coefficients A(1), A(2), . . . , and A(M) are different can be formulated. Simultaneous equations including M equations (9) in which the mutual capacitance changes $\Delta C(1)$, $\Delta C(2)$, . . . , and $\Delta C(M)$ are unknown can be solved by matrix operation. Accordingly, by solving the simultaneous equations based on the M detection signals S corresponding to the M different drive patterns, the controller 60 calculates the mutual capacitance changes $\Delta C(1)$, $\Delta C(2)$, . . . , and $\Delta C(M)$.

Upon calculating the mutual capacitance changes $\Delta C(1)$, $\Delta C(2)$, . . . , and $\Delta C(M)$ for one detection electrode ES-i, the controller 60 causes the switch portion 50 to select another detection electrode ES-i and connect the selected detection electrode ES-i to the detection signal generator 20. The controller 60 obtains M detection signals S corresponding to the M different drive patterns in the manner described above and solves the simultaneous equations to calculate the mutual capacitance changes $\Delta C(1)$, $\Delta C(2)$, . . . , and $\Delta C(M)$. By repeating this operation, the controller 60 calculates the mutual capacitance changes $\Delta C(1)$, $\Delta C(2)$, . . . , and $\Delta C(M)$ for all the detection electrodes ES.

In the electrostatic capacitance sensor according to the present embodiment, when the third drive signal (the drive signal for applying the reference voltage Vr to the drive electrode ED) is supplied to one or more of the drive electrodes ED, almost no voltage occurs at the capacitors C(i, j) formed between the one or more drive electrodes ED and the detection electrodes ES, and almost no charge is accumulated in these capacitors C(i, j). In this case, regardless of whether or not a noise component is superimposed on the reference voltage Vr, the capacitors C(i, j) formed between the one or more drive electrodes ED and the detection electrodes ES generate almost no charge to be transferred through the detection electrodes ES. Accordingly, even when a noise component is superimposed on the reference voltage Vr, the noise component does not affect one or more capacitors C(i, j) formed between the one or more drive electrodes ED and the detection electrodes ES. Also, charges generated in one or more capacitors C(i, j) are not transferred through the detection electrodes ES. Thus, the amount of error in the detection signals S can be reduced when the third drive signal is supplied to one or more drive electrodes ED. Thus, the amount of error due to a noise component can also be reduced in the mutual capacitance values (the mutual capacitance changes $\Delta C(1)$, $\Delta C(2)$, . . . , and $\Delta C(M)$) of the M capacitors C(i, j), the mutual capacitance values being calculated based on the M detection signals S.

Third Embodiment

Figure 4:
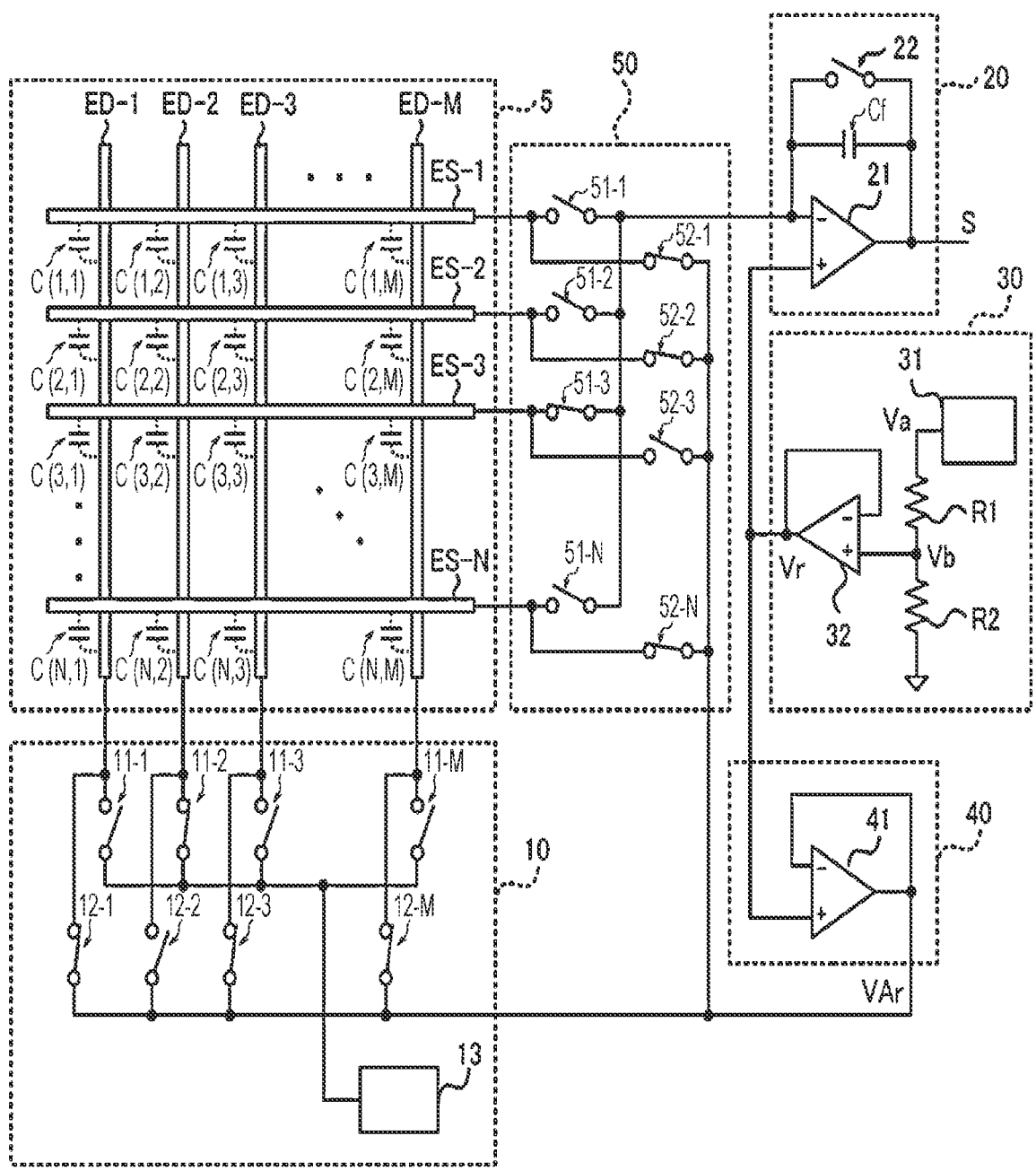
FIG. 4 is a diagram illustrating an example configuration of individual portions in an electrostatic capacitance sensor according to a third embodiment.

Next, a description will be given of an electrostatic capacitance sensor according to a third embodiment. FIG. 4 is a diagram illustrating an example configuration of individual portions in the electrostatic capacitance sensor according to the third embodiment. The electrostatic capacitance sensor according to the third embodiment is substantially the same as the electrostatic capacitance sensor illustrated in FIG. 2, except that a pseudo-reference voltage generator 40 is added to the electrostatic capacitance sensor illustrated in FIG. 2, and the driver 10 and the switch portion 50 use a pseudo reference voltage VAr instead of the reference voltage Vr.

The pseudo-reference voltage generator 40 generates the pseudo reference voltage VAr that is feedback-controlled so as to approach the reference voltage Vr and outputs the pseudo reference voltage VAr. In the example in FIG. 4, the pseudo-reference voltage generator 40 includes a third operational amplifier 41 having an inverting input terminal, a non-inverting input terminal, and an output terminal. The reference voltage Vr is input to the non-inverting input terminal, and the inverting input terminal and the output terminal are connected to each other. The third operational amplifier 41 output the pseudo reference voltage VAr, which is generally equal to the reference voltage Vr.

In accordance with control of the controller 60, the driver 10 causes the voltages of the M drive electrodes ED to change independently from each other. In accordance with control of the controller 60, the driver 10 applies the pseudo reference voltage VAr to each of the M drive electrodes ED.

In accordance with control of the controller 60, the switch portion 50 selects one detection electrode ES from the N detection electrodes ES and connects the selected detection electrode ES to the detection signal generator 20. Also, in accordance with control of the controller 60, the switch portion 50 connects each of the N detection electrodes ES to the pseudo reference voltage VAr.

When the driver 10 changes the voltage(s) of one or more of the drive electrodes ED, the controller 60 controls the driver 10 so as to apply the pseudo reference voltage VAr to the remaining drive electrodes ED. Also, when the switch portion 50 connects one of the detection electrodes ES to the detection signal generator 20, the controller 60 controls the switch portion 50 so as to connect the remaining detection electrodes ES to the pseudo reference voltage VAr.

The electrostatic capacitance sensor according to the present embodiment can also offer advantages that are similar to those of the above-described electrostatic capacitance sensor (FIG. 2) according to the first embodiment. Also, the third operational amplifier 41 in the pseudo-reference voltage generator 40 may be implemented by a circuit having capabilities (an offset characteristic, a frequency characteristic, and so on) that are equivalent to those of the first operational amplifier 21 in the detection signal generator 20. In such a case, a voltage difference between the detection electrode ES connected to the inverting input terminal of the first operational amplifier 21 in the detection signal generator 20 and the electrodes (the detection electrodes ES and the drive electrodes ED) connected to the pseudo reference voltage VAr can be further reduced to a minute difference, and the amount of noise included in the detection signals S can be reduced to a minute amount.

Fourth Embodiment

Figure 5:
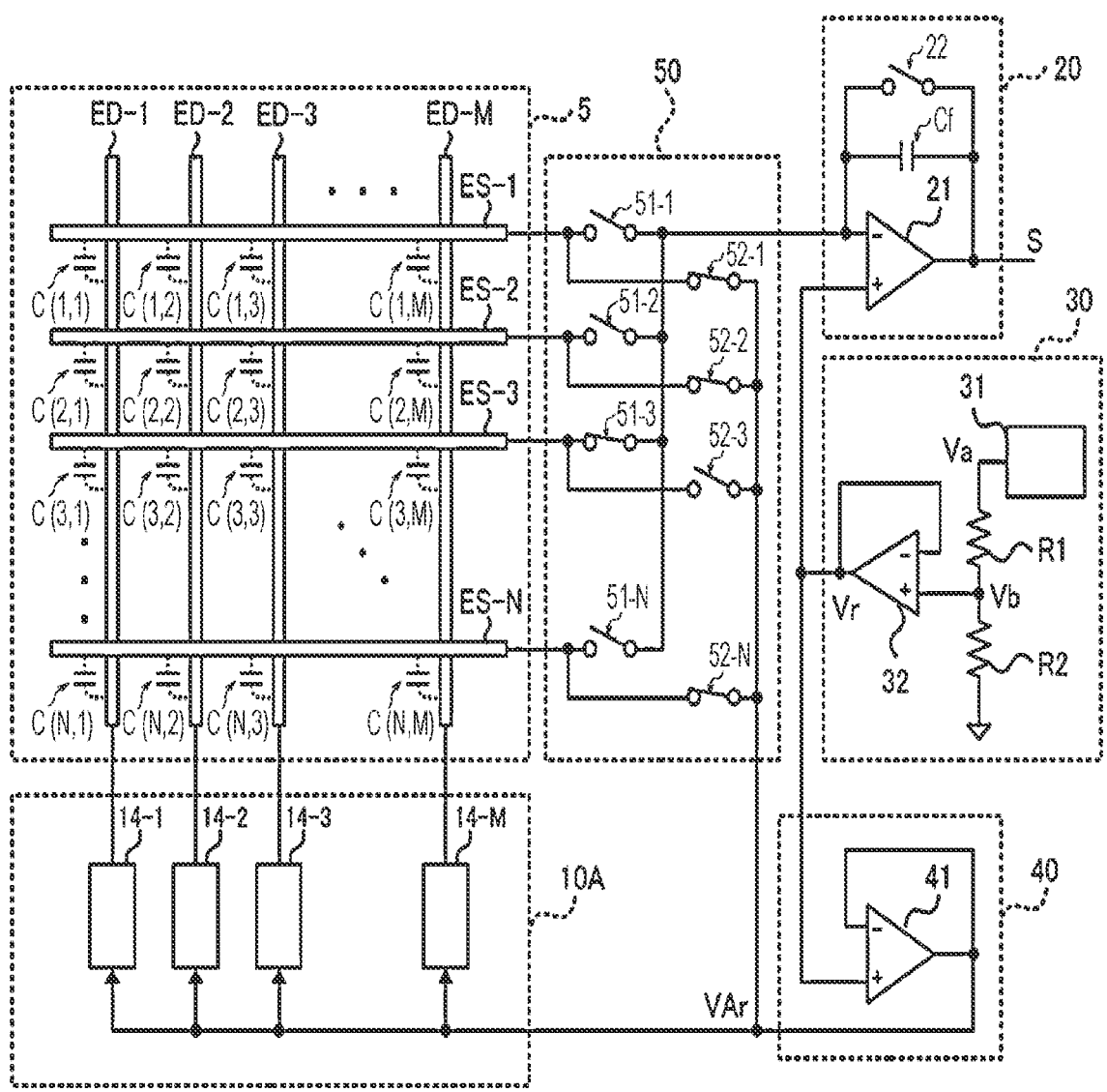
FIG. 5 is a diagram illustrating an example configuration of individual portions in an electrostatic capacitance sensor according to a fourth embodiment.
Figure 6A:
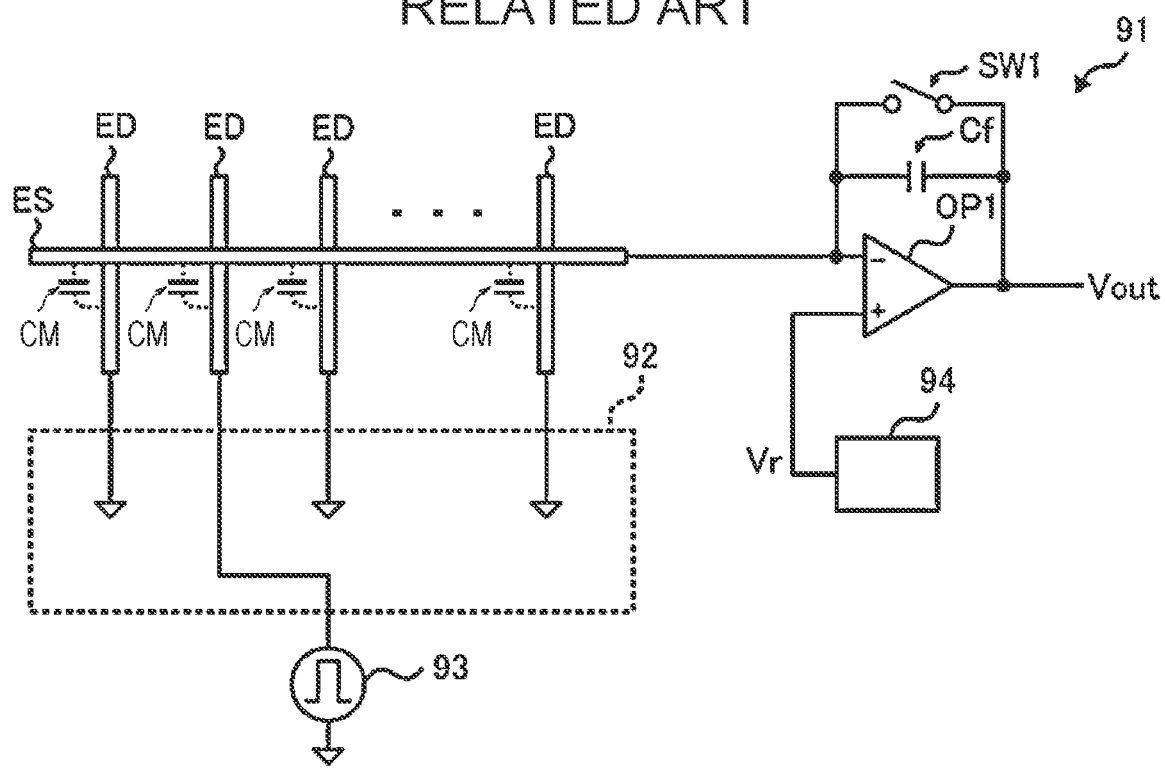
FIG. 6A is a diagram illustrating a general configuration of an electrostatic capacitance sensor based on a mutual capacitance system.
Figure 6B:
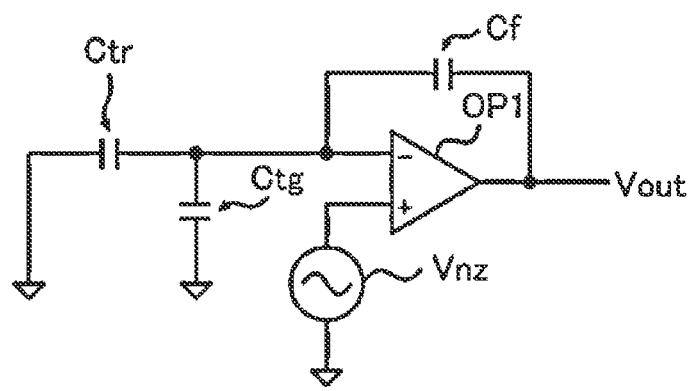
FIG. 6B is a diagram illustrating an alternating-current equivalent circuit of the electrostatic capacitance sensor illustrated in FIG. 6A.

Next, a description will be given of an electrostatic capacitance sensor according to a fourth embodiment. FIG. 5 is a diagram illustrating an example configuration of individual portions in the electrostatic capacitance sensor according to the fourth embodiment. The electrostatic capacitance sensor according to the fourth embodiment is substantially the same as the electrostatic capacitance sensor illustrated in FIG. 3, except that a pseudo-reference voltage generator 40 is added to the electrostatic capacitance sensor illustrated in FIG. 3, and the driver 10A and the switch portion 50 use a pseudo reference voltage VAr instead of the reference voltage Vr. The configuration of the pseudo-reference voltage generator 40 is substantially the same as that in the electrostatic capacitance sensor illustrated in FIG. 4.

The driver 10A in the electrostatic capacitance sensor illustrated in FIG. 5 includes M drive signal generators 14-1 to 14-M that respectively generate independent drive signals and is capable of supplying the drive signals to the respective M drive electrodes ED, as in the electrostatic capacitance sensor illustrated in FIG. 3. The drive signal generator 14-*j* can generate three types of drive signal (a first drive signal, a second drive signal, or a third drive signal), as in the electrostatic capacitance sensor illustrated in FIG. 3. The first drive signal and the second drive signal are the same as those in the electrostatic capacitance sensor illustrated in FIG. 3. The third drive signal is a signal for applying the pseudo reference voltage VAr to the drive electrode ED-*j*.

The electrostatic capacitance sensor according to the present embodiment can also offer advantages that are similar to those of the above-described electrostatic capacitance sensor (FIG. 3) according to the second embodiment. Also, the third operational amplifier 41 in the pseudo-reference voltage generator 40 may be implemented by a circuit having capabilities (an offset characteristic, a frequency characteristic, and so on) that are equivalent to those of the first operational amplifier 21 in the detection signal generator 20. In such a case, a voltage difference between the detection electrode ES connected to the inverting input terminal of the first operational amplifier 21 in the detection signal generator 20 and the electrodes (the detection electrodes ES and the drive electrodes ED) connected to the pseudo reference voltage VAr can be further reduced to a minute difference, and the amount of noise included in the detection signals S can be reduced to a minute amount.

The technical idea according to the present disclosure is not limited to the embodiments described above and includes a variety of variations.

For example, although examples of an electrostatic capacitance sensor including a plurality of detection electrodes ES have been described above in the embodiments, the number of detection electrodes may be one.

Although each of the M drive electrodes ED forms a parasitic capacitor with respect to each of the N detection electrodes ES in the above-described embodiments, one or more of the drive electrodes ED do not necessarily have to form a parasitic capacitor with respect to one or more of the detection electrodes ES in another embodiment.

What is claimed is:
1. An electrostatic capacitance sensor comprising:
at least one detection electrode;
a plurality of drive electrodes, respective capacitors being formed between the plurality of drive electrodes and the at least one detection electrode;
a reference voltage generator configured to generate a reference voltage;
a driver capable of causing respective voltages of the plurality of drive electrodes to change independently from one another, and applying the reference voltage to each of the plurality of drive electrodes;
a detection signal generator configured to transfer electric charges to the at least one detection electrode such that a voltage of the at least one detection electrode approaches the reference voltage, thereby generating a detection signal according to the transferred electric charges; and
a controller that controls the driver,
wherein the detection signal generator includes:
a first operational amplifier having an inverting input terminal connected to the at least one detection electrode, and a non-inverting input terminal to which the reference voltage is input;
wherein the reference voltage generator includes:
a reference voltage source having a first output terminal;
a first resistor and a second resistor which are connected in series between the first output terminal and ground; and
a second operational amplifier having a second output terminal, an inverting input terminal connected to the second output terminal, and a non-inverting input terminal connected to a connection midpoint of the first resistor and the second resistor,
and wherein the controller is configured to control the driver such that, when the driver causes a voltage of one or more of the plurality of drive electrodes to change, the driver applies the reference voltage to the remaining of the plurality of drive electrodes.

2. The electrostatic capacitance sensor according to claim 1, further comprising:
a switch section capable of selecting one detection electrode from among a plurality of detection electrodes and connecting the selected detection electrode to the detection signal generator, and capable of connecting each of the plurality of detection electrodes to the reference voltage,
wherein the controller is further configured to control the switch section such that, when the switch section connects one of the plurality of detection electrodes to the detection signal generator, the switch section connects the remaining detection electrodes to the reference voltage.

3. The electrostatic capacitance sensor according to claim 1,
wherein the driver is capable of supplying a drive signal to each of the plurality of drive electrodes, the drive signal being one of a first drive signal for increasing a voltage of the drive electrode by an amount corresponding to a predetermined voltage difference, a second drive signal for reducing the voltage of the drive electrode by the amount corresponding to the predetermined voltage difference, and a third drive signal for applying the reference voltage to the drive electrode,
wherein a number of the plurality of drive electrodes is M, where M is an integer equal to or greater than 2, and a combination of the first, second, and third drive signals constituting M drive signals simultaneously supplied to the M drive electrodes is defined as a drive pattern,
and wherein the controller is further configured to control the driver such that the driver supplies the drive signals M times to the M drive electrodes in accordance with M different drive patterns, thereby obtaining M detection signals generate by the detection signal generator corresponding to the M different drive patterns, and to calculate mutual capacitance values of M capacitors formed between the detection electrode and the M drive electrodes, based on the M detection signals.

4. The electrostatic capacitance sensor according to claim 1,
wherein the detection signal generator further includes:
a feedback capacitor provided on a path between an output terminal of the first operational amplifier and the inverting input terminal of the first operational amplifier.

5. An electrostatic capacitance sensor comprising:
at least one detection electrode;
a plurality of drive electrodes, respective capacitors being formed between the plurality of drive electrodes and the at least one detection electrode;
a reference voltage generator configured to generate a reference voltage;
a pseudo-reference voltage generator configured to generate a pseudo-reference voltage which is feedback-controlled so as to approach the reference voltage;
a driver capable of causing respective voltages of the plurality of drive electrodes to change independently from one another, and applying the pseudo-reference voltage to each of the plurality of drive electrodes;
a detection signal generator configured to transfer electric charges to the at least one detection electrode such that a voltage of the at least one detection electrode approaches the reference voltage, thereby generating a detection signal according to the transferred electric charges; and
a controller configured to control the driver,
wherein the detection signal generator includes:
a first operational amplifier having an inverting input terminal connected to the at least one detection electrode; and a non-inverting input terminal to which the reference voltage is input,
wherein the reference voltage generator includes:
a reference voltage source having a first output terminal;
a first resistor and a second resistor which are connected in series between the first output terminal and ground; and
a second operational amplifier having a second output terminal, an inverting input terminal connected to the second output terminal, and a non-inverting input terminal connected to a connection midpoint of the first resistor and the second resistor;
and wherein the controller is configured to control the driver such that, when the driver causes a voltage of one or more of the plurality of drive electrodes to change, the driver applies the pseudo reference voltage to the remaining of the plurality of drive electrodes.

6. The electrostatic capacitance sensor according to claim 5, further comprising:
a switch section capable of selecting one detection electrode from among a plurality of detection electrodes, connecting the selected detection electrode to the detection signal generator, and connecting each of the plurality of detection electrodes to the pseudo reference voltage,
wherein, the controller is further configured to control the switch section such that, when the switch section connects one of the plurality of detection electrodes to the detection signal generator, the switch section connects the remaining detection electrodes to the pseudo reference voltage.

7. The electrostatic capacitance sensor according to claim 5,
wherein the driver is capable of supplying a drive signal to each of the plurality of drive electrodes, the drive signal being one of a first drive signal for increasing a voltage of the drive electrode by an amount corresponding to a predetermined voltage difference, a second drive signal for reducing the voltage of the drive electrode by the amount corresponding to the predetermined voltage difference, and a third drive signal for applying the pseudo reference voltage to the drive electrode,
wherein a number of plurality of drive electrodes is M, where M is an integer equal to or greater than 2, and a combination of the first, second, and third drive signals constituting M drive signals simultaneously supplied to the M drive electrodes is defined as a drive pattern,
and wherein the controller is further configured to control the driver such that the driver supplies the drive signals M times to the M drive electrodes in accordance with M different drive patterns, thereby obtaining M detection signals generated by the detection signal generator corresponding to the M different drive patterns, and to calculate mutual capacitance values of M capacitors formed between the detection electrode and the M drive electrodes, based on the M detection signals.

8. The electrostatic capacitance sensor according to claim 5,
wherein the detection signal generator further includes:
a feedback capacitor provided on a path between an output terminal of the first operational amplifier and the inverting input terminal of the first operational amplifier.

* * * * *